(12) United States Patent
Loftus et al.

(10) Patent No.: US 9,925,884 B2
(45) Date of Patent: Mar. 27, 2018

(54) CONTACTOR COIL CURRENT REDUCTION DURING VEHICLE BATTERY CHARGING

(71) Applicant: Ford Global Technologies, LLC, Dearborn, MI (US)

(72) Inventors: Michael Edward Loftus, Northville, MI (US); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 610 days.

(21) Appl. No.: 14/275,006

(22) Filed: May 12, 2014

(65) Prior Publication Data
US 2015/0325396 A1 Nov. 12, 2015

(51) Int. Cl.
*H02P 1/00* (2006.01)
*B60L 11/18* (2006.01)
*H01H 47/04* (2006.01)
*B60L 3/00* (2006.01)

(52) U.S. Cl.
CPC ......... *B60L 11/1838* (2013.01); *B60L 3/0046* (2013.01); *B60L 3/0069* (2013.01); *B60L 11/18* (2013.01); *B60L 11/1809* (2013.01); *B60L 11/1816* (2013.01); *H01H 47/04* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
CPC ....... H01H 47/04; B60L 11/08; B60L 11/1809
USPC .......................................................... 318/139
See application file for complete search history.

(56) References Cited

U.S. PATENT DOCUMENTS

| | | | |
|---|---|---|---|
| 5,820,172 A * | 10/1998 | Brigham | B60K 6/485 180/65.26 |
| 8,228,037 B2 | 7/2012 | Furukawa et al. | |
| 8,253,269 B2 | 8/2012 | Dickerhoof et al. | |
| 2003/0158638 A1* | 8/2003 | Yakes | A62C 27/00 701/22 |

(Continued)

FOREIGN PATENT DOCUMENTS

WO 20130115034 A1 8/2013

*Primary Examiner* — Bentsu Ro
*Assistant Examiner* — Gabriel Agared
(74) *Attorney, Agent, or Firm* — David B. Kelley; Brooks Kushman P.C.

(57) ABSTRACT

Methods and systems are described to control the use of electrical power when charging a traction battery. A vehicle module can drive the contactor coils with two set-points for controlling the power into the contactor coils, namely, a travel or vehicle "on" set point and a charging, vehicle "off" set point. In use, full power is initially applied to the coils to guarantee immediate closure of the contactor. During charging and after closing the contactor, the power is set at the charging, vehicle "off" set point. The travel or vehicle "on" set point is higher than the charging, vehicle "off" set point. Using the charging, vehicle "off" set point reduces electricity consumption. The vehicle "on" set point is at a higher electrical level as it must maintain closure under worst-case vibration and shock conditions considering mounting location, contactor orientation, as well as other characteristics of the vehicle and contactor.

17 Claims, 4 Drawing Sheets

(56) References Cited

U.S. PATENT DOCUMENTS

| | | | | |
|---|---|---|---|---|
| 2005/0228553 A1* | 10/2005 | Tryon | ............... | B60K 6/46 |
| | | | | 701/22 |
| 2011/0218698 A1* | 9/2011 | Bissontz | ............ | B60L 11/00 |
| | | | | 701/22 |
| 2014/0001833 A1* | 1/2014 | Grupido | ........... | B60L 11/1803 |
| | | | | 307/9.1 |
| 2014/0002939 A1* | 1/2014 | Grupido | ............ | B60L 3/0084 |
| | | | | 361/91.1 |

* cited by examiner

CONTACTOR COIL CURRENT REDUCTION DURING VEHICLE BATTERY CHARGING

TECHNICAL FIELD

Various embodiments relate to an electric vehicle and a method for controlling connection to the traction battery, and, specifically, to vehicles with contactors and methods and systems to reduce contactor coil current while charging.

BACKGROUND

Electric vehicles rely on the battery to provide electrical energy to propel a vehicle. The batteries are charged with electricity through circuitry from a generator or from the electrical grid. Connection must be made between the battery and other circuitry in the vehicle, which can be challenging in view of the high power or high voltage of traction batteries.

SUMMARY

Vehicles with a traction battery have low voltage applications and high voltage applications. The low voltage can be used to control a contactor that electrically connects the high voltage to high voltage circuitry. A contactor requires constant current to hold the contactor closed to maintain electric connection to the battery. The present disclosure describes using at least two different signals to hold the contactor in the conductive state. These at least two signals can vary in electrical energy and can be selected based on the vehicle state.

In an example, a vehicle includes a traction battery and circuitry selectively connecting the traction battery to a charging source or electric motor. The charging circuitry includes an open state, a first closed state and a second closed state. The open state is not electrically conductive. The closed states are electrically conductive and have different power associated with them. A controller is configured to provide signals to control circuitry state.

DETAILED DESCRIPTION

Figure 1:
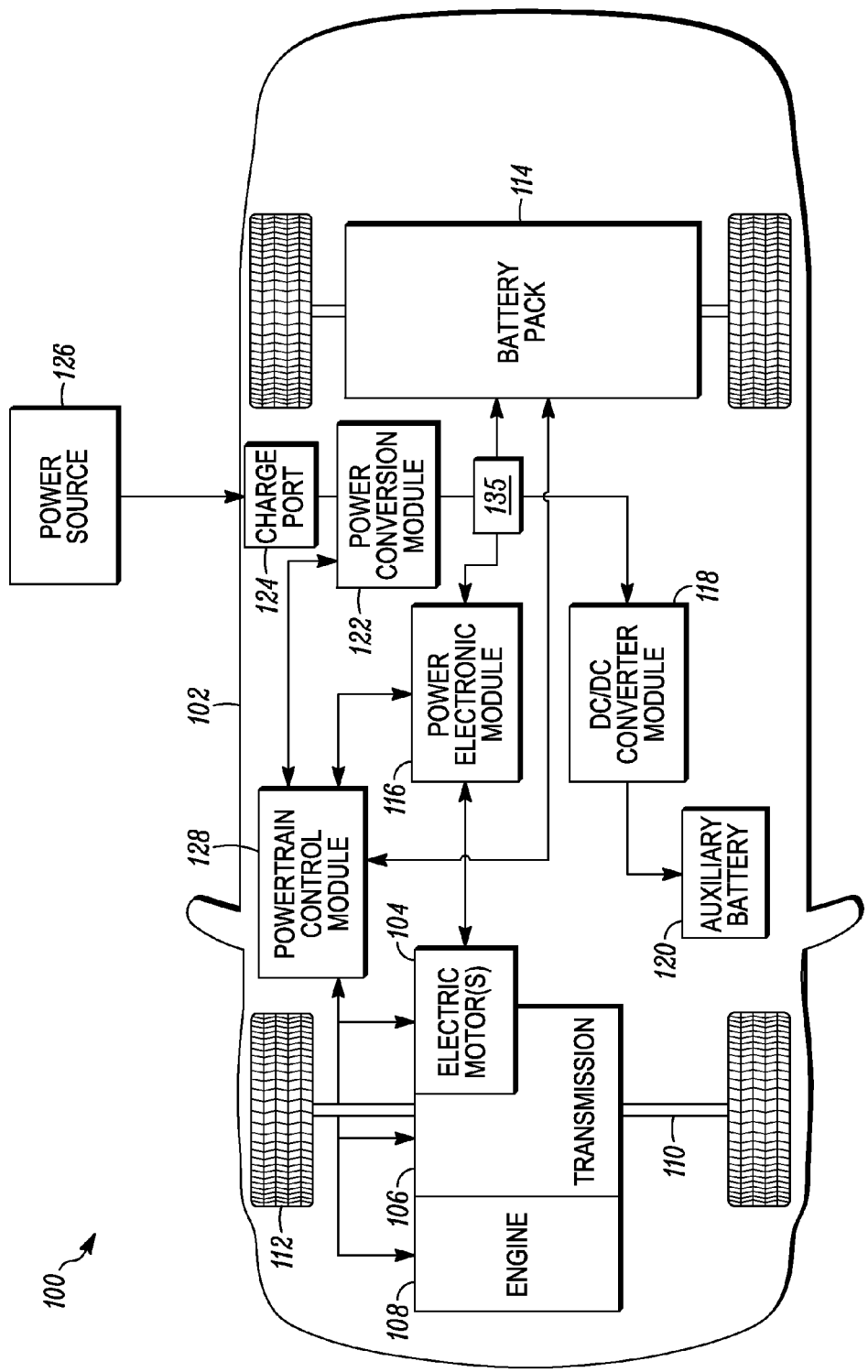
FIG. 1 is a hybrid electric vehicle that can be used with the described systems and methods.

Embodiments of the present disclosure are described herein. It is to be understood, however, that the disclosed embodiments are merely examples and other embodiments can take various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the Figures can be combined with features illustrated in one or more other Figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As an overview, the present disclosure describes systems and methods to reduce electrical power consumption while charging an electric vehicle. Electric vehicles (EVs) can employ one or more main contactors (e.g., large relays) to control the connection between the high voltage traction battery and the rest of the vehicle. The energy from the traction battery is primarily used for propulsion but also for other uses including providing lower voltage power, e.g., 12V power, through a DC to DC converter. A battery control module (BCM) drives the contactor coils with lower voltage power according to strategy implemented in embedded software. There are two set-points for controlling the power into the contactor coils. Full power is initially applied to the coils to guarantee immediate pull-in of the contacts. Following successful pull-in, the power is reduced to a lower level guaranteed to maintain closure under worst-case vibration and shock conditions considering the contactor mounting location, contactor orientation, etc. Plug-in Hybrid Electric Vehicles (PHEVs) and Battery Electric Vehicles (BEVs) both have charging modes in which the vehicle must be stationary when it is plugged-in or otherwise coupled to an electrical energy source, e.g., a charging source. There are conditions under which lower power loads are required while the vehicle is charging, e.g., cabin pre-conditioning. This use case results in the BCM driving the main contactors with a level of power specified for worst-case road-load conditions while the vehicle is stationary, i.e., not on the road. This results in a waste of electrical energy.

As described herein a plurality of closing set-points are provided with one closing set-point using less energy than another. In an example, a three-level set-point strategy for main contactor control is used, i.e., close set-point to move the contactor closed and two close set-points to maintain the contactor closed. The third set-point, which can be lower power or lower current than the other two set-points, is used when the electric vehicle, e.g., a PHEV or a BEV, is charging. As with the existing two values, the contactor coil current value for the third set-point can be maintained through closed-loop current control in embedded software. It is expected that the reduction in coil current for the novel third set-point for retaining the contactor during vehicle charging will provide appreciable benefits when considering the efficiency losses of the DC to DC conversion to provide the lower voltage to power the contactor.

FIG. 1 depicts an example of a hybrid-electric vehicle 102, e.g., plug-in hybrid-electric vehicle. A plug-in hybrid-electric vehicle 102 may comprise one or more electric motors 104 mechanically connected to a hybrid transmission 106. In addition, the hybrid transmission 106 is mechanically connected to an engine 108. The hybrid transmission 106 may also be mechanically connected to a drive shaft 110 that is mechanically connected to the wheels 112. The electric motors 104 can provide torque to the wheels when the engine 108 is turned on. Electric motor 104 consumes electrical energy, e.g., from a battery 114, to provide torque to propel the vehicle 102. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery output is made in response to a battery power request, which can be calculated from the feedforward battery power value as a function of the driver power request and the engine power request, which in turn can be based on the speed and torque determinations. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a typical battery pack 14 may provide a DC voltage while the electric motors 104 may require a three-phase AC current to function. The power electronics module 116 may convert the DC voltage to a three-phase AC current as required by the electric motors 104. In a regenerative mode, the power electronics module 116 will convert the three-phase AC current from the electric motors 104 acting as generators to the DC voltage required by the battery pack 114. The methods described herein are equally applicable to a pure electric vehicle or any other device using a battery pack. The battery 114 can experience degradation during certain uses of the vehicle. One use in which degradation occurs is storage at a high state of charge (SOC). Temperature can also be a factor in degradation Battery degradation is individualized for a specific type of battery. Battery degradation can include the inability of a battery 114 to hold a quantity of charge, e.g., less kW-hours or amp-hours are stored in the battery 114.

In addition to providing energy for propulsion, the battery 114 (or battery pack) may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V battery 120. An all-electric vehicle may have a similar architecture but without the engine 108.

The battery pack 114 may be recharged by an external power source 126. The battery charge storage status can be measured as state of charge. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

A contactor 135 is provided to electrically connect and disconnect the battery 114 from the other high voltage components in the vehicle 102. The contactor 135 can receive control signals from the power electronics module 116 to change the state of the contactor from open circuit (its unpowered state) and closed circuit (its powered state). The contactor 135 is operated by three signals. A high energy signal to move the contacts in the contactor 135 to the closed position. A medium energy signal that maintains the contactor 135 in the closed position even when the vehicle is "on" or the vehicle is moving. This medium energy signal must ensure that the electrical connection from the battery to the remainder of the vehicle, e.g., drive train and motor 104, is closed so that the electrical energy from the battery 114 can power the vehicle. A lower energy signal is also applied. This signal has less power than the other two signals and can hold the contacts of the contactor in place when the vehicle is stationary. The lower energy signal can be used when the vehicle is charging and not moving. The contactor requires less energy to remain closed when the vehicle is off or not moving as the mechanical motions or vibrations are not being produced by the vehicle and need not be overcome by the contactor 135. The contactor 135 requires the medium energy signal to ensure that it maintains a closed contact regardless of the motion, vibration, jolts or other motions of the vehicle.

In addition to illustrating a plug-in hybrid vehicle, FIG. 1 can illustrate a battery electric vehicle (BEV) if component 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, connectors, high voltage wires, and circuit interrupt devices.

Figure 2:
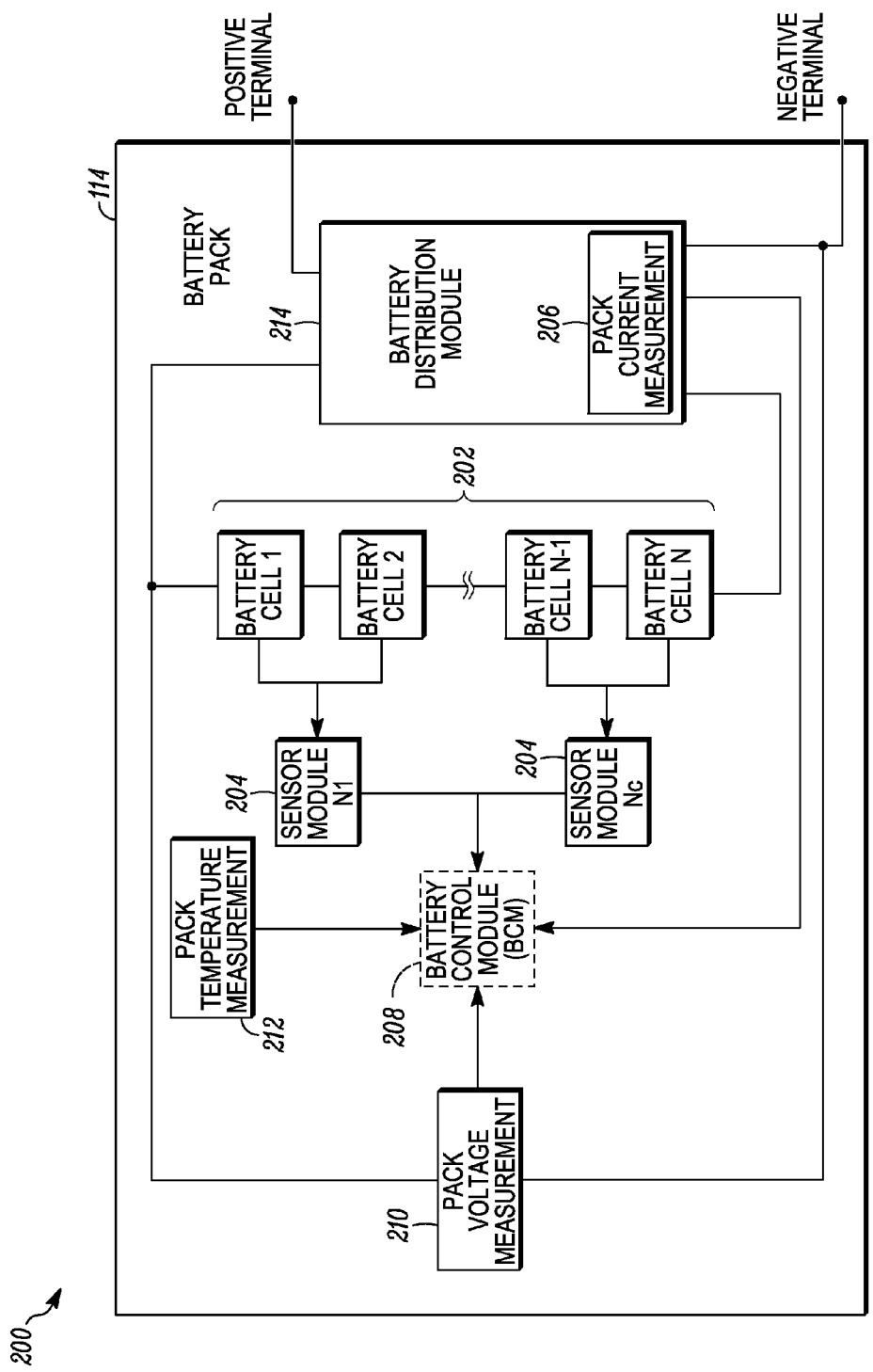
FIG. 2 is a detailed view of a battery for a hybrid electric vehicle.

The individual battery cells within a battery pack may be constructed from a variety of chemical formulations. Typical battery pack chemistries may include but are not limited to lead acid, nickel cadmium (NiCd), nickel-metal hydride (NIMH), Lithium-Ion or Lithium-Ion polymer. FIG. 2 shows a typical battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A typical system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker.

In addition to the pack level characteristics, there may be battery cell level characteristics that need to be measured and monitored. For example, the terminal voltage, current, and temperature of each cell may be measured. A system may use a sensor module 204 to measure the characteristics of one or more battery cell modules 202. The characteristics may include battery cell voltage, temperature, age, number of charge/discharge cycles, etc. Typically, a sensor module will measure battery cell voltage. Battery cell voltage may be voltage of a single battery or of a group of batteries electrically connected in parallel or in series. The battery pack 200 may utilize up to $N_c$ sensor modules 204 to measure the characteristics of all the battery cells 202. Each sensor module 204 may transfer the measurements to the BCM 208 for further processing and coordination. The sensor module 204 may transfer signals in analog or digital form to the BCM 208. The battery pack 200 may also contain a battery distribution module (BDM) 214 which controls the flow of current into and out of the battery pack 200.

In the FIG. 2 example, the positive terminal and the negative terminal can be connected to the terminals of a contactor (not shown in FIG. 2). The contactor can selectively connect the battery 114 to other circuitry and can be closed (e.g., electrically conductive) by electrically energizing a coil that moves terminals into contact with each other thereby electrically connecting the battery to vehicle circuitry. When the contactor is open (e.g., not electrically conductive), the coil is not energized or does not have enough energy to move the terminals into contact and hold the terminals in contact with each other.

While the contactor 135 is shown above in the vehicle 102 outside the battery 114, the contactor 135 can also be positioned inside the battery 114.

Figure 3:
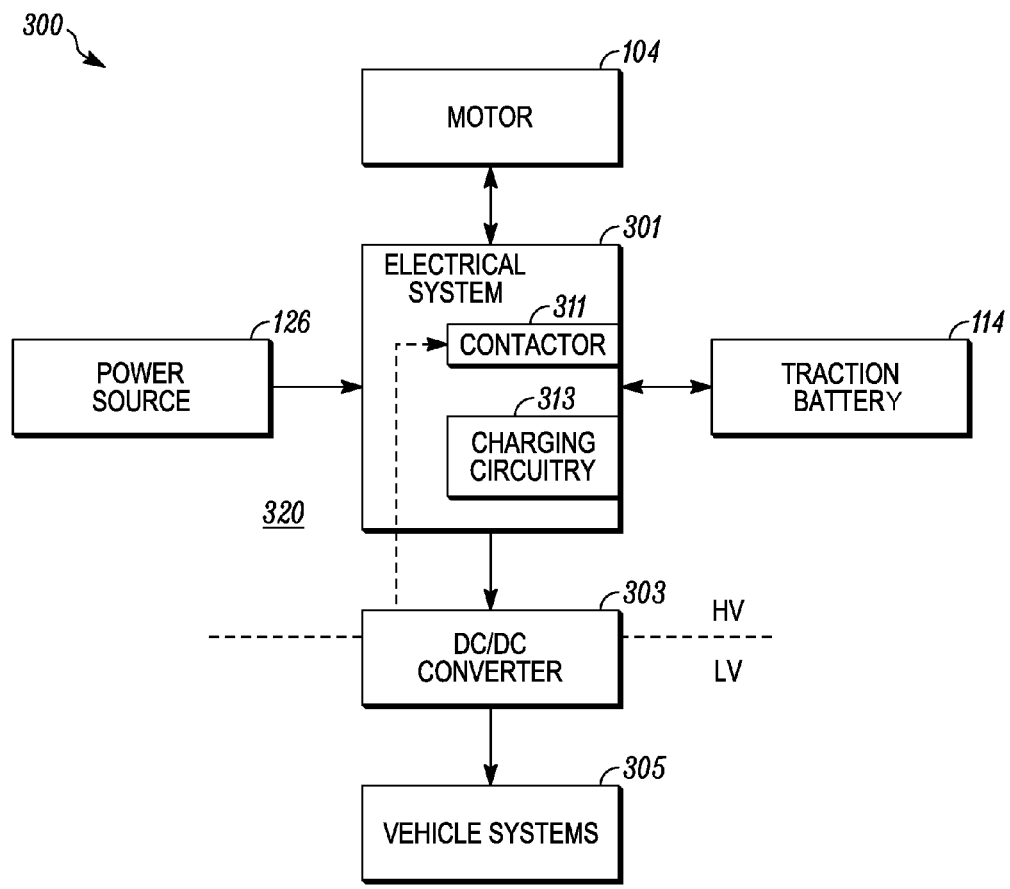
FIG. 3 is a schematic view of a system including a hybrid electric vehicle.

FIG. 3 shows a system 300 that has an electrical system 301 electrically connecting the power source 114 and the motor 114 with the traction battery 114. The electrical system 301 includes a contactor 311 and charging circuitry 313. The contactor 311 is configured to selectively, electrically connect the traction battery 114 to circuitry connected to either the motor 104 or power source 126. The contactor 311 includes four components. A housing that supports the other components and can help protect against unwanted contacts to the other components. The housing can also protect against the environment. The contactor 311 includes contacts that selectively, physically move to come into mechanical and electrical contact. The contacts carry current when closed. Examples of contacts include power contacts, auxiliary contacts, and contact springs. A coil is mounted in the housing and is an electromagnet that provides the driving force to close the contacts and electrically connect the traction battery to the electrical system 301 and, hence, to the motor 104 and power source 126.

The charging circuitry 313 can connect the power source to the traction battery 114 to charge the traction battery 114 by forcing electrical current into the battery so that the battery stores electrical energy.

The electrical system 301 can also provide electrical energy to a DC/DC converter 303. The DC/DC converter 303 drops the voltage of the electrical system 301, and in particular, the DC voltage from the traction battery 114 to a standard voltage used by vehicle systems 305, e.g., entertainment systems, cabin control systems, lighting, etc. An example of a standard vehicle voltage is 12 volts. DC to DC conversion will result in electrical losses. The DC/DC can schematically separate the high voltage side (HV) from the low voltage (LV) side in the vehicle electrical systems. The high voltage side is the side of the traction battery. The low voltage side is opposite the high voltage and on the other side of the DC/DC converter. The low voltage side can be the 12 volt side. The DC/DC converter 303 can also provide the electrical energy or signal 320 that activates the contactor 311. This electrical energy can be stored in an auxiliary battery or otherwise conditioned by other circuitry on the low voltage side of the vehicle. As a result, the signal required to activate the contactor 311 has experienced losses due to DC/DC converter stepping down the voltage from the traction battery voltage. When in a charging state, the energy that was converted by the DC/DC converter 303 is used by the electrical system 301 to close the contactor 311 so that electrical energy flows from the power source 126 to the traction battery 114. A high power signal is required to move the contacts in the contactor 311 from the at-rest, open state to an energized, closed state. When the vehicle is moving or in the on position, then a first retaining signal is applied to the contacts to hold the contacts closed under all operating conditions to provide energy from the battery to the electrical system and/or the motor 104. When the vehicle is an at-rest or in the "off" position, then a second retaining signal is applied to the contacts to hold the contacts closed under this stable vehicle condition to provide energy from the power source 126 to the battery 114 through the contactor. As the vehicle and, hence, the contactor, will not experience vibrations, road effects, or other mechanical stresses when off or plugged into a power source 126, the second retaining signal has less holding power than the first retaining signal. In an example, the first retaining signal is at about 200 milliamps, +/−10 milliamps. In an example, the first retaining signal is at about 150 milliamps, +/−10 milliamps. In an example, the high power signal is at about 300 milliamps, +/−10 milliamps. The ranges for these signals can also be +/−5 milliamps or +/−15 milliamps. The second retaining signal can be half the power of the high power signal. In an example, the second retaining signal is 20-30% less than the first retaining signal. In an example, the second retaining signal is 25% less than the first retaining signal. In an example, the second retaining signal is 50% less than the first retaining signal. In an example, the first retaining signal is 30% more than the second retaining signal. In an example, the first retaining signal is 50% more than the second retaining signal. These percentages can also be in ranges of +/−2%, +/−5% or +/−10%. In an example, the voltage for the contactor excitation signals is provided by the vehicle rail voltage, e.g., 12 volts.

Figure 4:
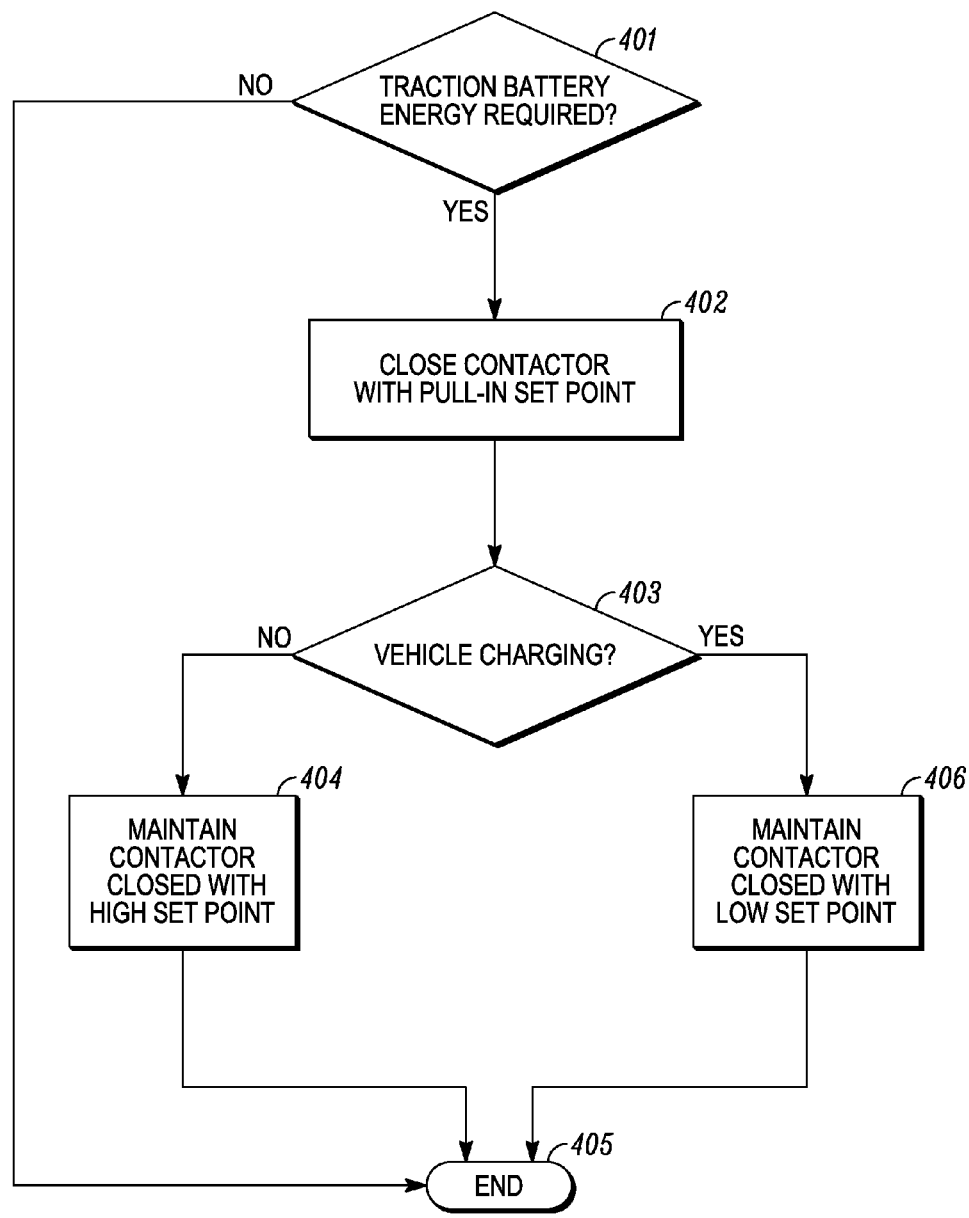
FIG. 4 is a flowchart of a method according to an example.

FIG. 4 shows a flowchart according to a method 400. At 401, it is determined whether energy is required to flow from the traction battery or from the traction battery. If no, then the method ends and the contactor stays in its default open state. If yes, then at 402 the contactor is closed with a signal at the pull-in set point, e.g., the high energy signal of FIG. 3. At 403 it is determined whether the vehicle is charging. For example, the vehicle is connected to an external charger. In an example, the vehicle can also be charged by an on-vehicle motor. If the vehicle is not charging (i.e., step 403 is no), then the contactor is maintained in the closed state with a high set point retaining signal. If the vehicle is charging (i.e., step 403 is yes), then the contactor is maintained in the closed state with a low set point retaining signal. In an example, the low set point retaining signal can be used when the vehicle is not "on" as the vehicle will not experience vibrations or mechanical shocks that could overcome the contactor closing force and open the contacts. The low set point retaining signal has less power than the high set point retaining signal. In an example, the low set point retaining signal has less current than the high set point retaining signal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a traction battery;
   contactor circuitry; and
   a controller programmed to
      apply, during vehicle travel, a first signal to the contactor circuitry to maintain an electrical connection between the traction battery and an electric motor while a first traction battery signal flows between the traction battery and the electric motor, and
      apply, during battery charging while the vehicle is stationary, a second signal to the contactor circuitry to maintain an electrical connection between the traction battery and a charging source while the first traction battery signal does not flow between the traction battery and the electric motor with maintaining the electrical connection for a non-traction signal, wherein the first signal has greater power than the second signal and holds the contactor circuitry in the electrical connection with greater force than the second signal.

2. The vehicle of claim 1, wherein the controller is further programmed to apply a third signal to the contactor circuitry to initiate connection of the traction battery to the electric motor, wherein the third signal has greater voltage than the first signal.

3. The vehicle of claim 2, wherein the power of the third signal is about 50% greater than the voltage of the first signal and about 200% greater than the voltage of the second signal.

4. The vehicle of claim 1, wherein the controller is further programmed to apply a third signal to the circuitry to initiate connection of the traction battery to the charging source, wherein the third signal has greater voltage than the first signal,
   wherein the contactor circuitry transmits a traction DC signal from the traction battery to power the electric motor when held in contact by the first signal to the contactor circuitry, and
   wherein the contactor circuitry transmits a charge DC signal to the traction battery when held in contact by the second signal to the contactor circuitry.

5. The vehicle of claim 4, wherein the voltage of the third signal is about 50% greater than the voltage of the first signal and about 200% greater than the voltage of the second signal.

6. A traction battery control method comprising:
   applying a close signal to a contactor to electrically connect a traction battery to vehicle circuitry to drive an electric motor;
   applying a first retain signal to the contactor to hold the contactor in a closed state with the vehicle in motion, wherein the first retain signal has less power than the close signal;
   applying the close signal to the contactor to electrically connect the traction battery to vehicle circuitry to charge the battery; and
   applying a second retain signal to the contactor to hold the contactor in a closed state during charging of the battery while the vehicle is stationary, wherein the second retain signal has less power than the first retain signal,
   wherein the close signal, first retain signal, and the second retain signal are different.

7. The method of claim 6, wherein the power associated with the close signal is about 50% greater than the power associated with the first retain signal and about 200% greater than the power associated with the second retain signal.

8. The method of claim 6, wherein a current associated with the close signal is about 300 milliamps, a current associated with the first retain signal is about 200 milliamps, and a current associated with the second retain signal is about 150 milliamps.

9. The method of claim 6, wherein the second retain signal further has a lower voltage than the first retain signal.

10. The method of claim 9, wherein the close signal further has a higher voltage than the first retain signal.

11. A vehicle comprising:
    a traction-battery;
    a contactor configured to selectively connect the traction-battery to an electric motor or charging source, the contactor having an open state in an absence of an applied voltage, a first closed-state in a presence of a first applied voltage for travel, a second closed-state in a presence of a second applied voltage less than the first applied voltage only for charging; and
    a controller for providing the applied voltages.

12. The vehicle of claim 11, wherein the controller is further programmed to provide the first applied voltage during travel of the vehicle to maintain electrical connection between the battery and motor.

13. The vehicle of claim 11, wherein the controller is further programmed to provide the second voltage during charging of the battery while the vehicle is stationary to maintain electrical connection between the battery and charging source.

14. The vehicle of claim 11, wherein a power associated with the first applied voltage is greater than a power associated with the second applied voltage.

15. The vehicle of claim 11, wherein the first and second applied voltages are associated with a vehicle system rail voltage.

16. The vehicle of claim 11, wherein the controller is further programmed to:
    provide the first applied voltage during travel of the vehicle to maintain electrical connection between the battery and motor, and
    provide the second voltage during charging of the battery while the vehicle is stationary to maintain electrical connection between the battery and charging source.

17. The vehicle of claim 16, wherein a power associated with the first applied voltage is greater than a power associated with the second applied voltage; and wherein at least one of the first applied voltage, the second applied voltage, or both are a vehicle system rail voltage.

* * * * *